United States Patent
Lansirinne et al.

(10) Patent No.: US 11,212,259 B2
(45) Date of Patent: Dec. 28, 2021

(54) INSPECTION OFFLOAD CLUSTERING

(71) Applicant: Forcepoint LLC, Austin, TX (US)

(72) Inventors: Mika Lansirinne, Helsinki (FI);
Valtteri Rahkonen, Helsinki (FI);
Pekka Riikonen, Helsinki (FI)

(73) Assignee: Forcepoint LLC, Austin, TX (US)

( * ) Notice: Subject to any disclaimer, the term of this patent is extended or adjusted under 35 U.S.C. 154(b) by 289 days.

(21) Appl. No.: 15/892,581

(22) Filed: Feb. 9, 2018

(65) Prior Publication Data
US 2019/0253391 A1    Aug. 15, 2019

(51) Int. Cl.
*H04L 29/06*    (2006.01)

(52) U.S. Cl.
CPC ...... *H04L 63/0245* (2013.01); *H04L 63/0263* (2013.01); *G06F 2209/509* (2013.01)

(58) Field of Classification Search
CPC ............. H04L 63/0245; H04L 63/0263; G06F 2209/509
See application file for complete search history.

(56) References Cited

U.S. PATENT DOCUMENTS

| | | | | |
|---|---|---|---|---|
| 8,997,231 B2* | 3/2015 | Karta | ................... | H04L 63/1416 |
| | | | | 726/23 |
| 9,690,928 B2* | 6/2017 | Saxena | ................. | G06F 21/566 |
| 9,696,696 B2* | 7/2017 | Obrist | ................ | G05B 13/0245 |
| 10,757,121 B2* | 8/2020 | Dasgupta | ............ | H04L 63/1425 |
| 2006/0179296 A1* | 8/2006 | Bartlett | ............... | H04L 63/1416 |
| | | | | 713/152 |
| 2008/0098113 A1* | 4/2008 | Hansen | ............... | H04L 63/0254 |
| | | | | 709/226 |
| 2017/0359264 A1* | 12/2017 | Bird | ...................... | H04L 43/026 |

* cited by examiner

*Primary Examiner* — Christopher A Revak
(74) *Attorney, Agent, or Firm* — Jackson Walker L.L.P.

(57) ABSTRACT

A method, system, and computer-usable medium are disclosed for performing packet processing of network traffic on a master security device of a plurality of security devices, such packet processing including connection tracking for the network traffic, and offloading packet inspection of the network traffic to one or more slave security devices of the plurality of security devices.

18 Claims, 3 Drawing Sheets

INSPECTION OFFLOAD CLUSTERING

FIELD OF DISCLOSURE

The present invention relates in general to the field of computers and similar technologies, and in particular to software utilized in this field. Still more particularly, it relates to a method, system, and computer-usable medium for performing inspection offload clustering at slave security devices of a cluster of security devices.

BACKGROUND

In some instances, performance of a single security device in inspecting network traffic may be limited, and a cluster of multiple security devices may be used in parallel to carry out network inspection. However, using typical approaches, clustering of multiple security devices often does not scale well beyond a small number (e.g., three to four) of security devices, due to difficulty in the synchronization of connection data among the security devices and/or the dispatching of the inspected traffic.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include performing packet processing of network traffic on a master security device of a plurality of security devices, such packet processing including connection tracking for the network traffic, and offloading packet inspection of the network traffic to one or more slave security devices of the plurality of security devices.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for performing packet processing of network traffic on a master security device of a plurality of security devices, such packet processing including connection tracking for the network traffic, and offloading packet inspection of the network traffic to one or more slave security devices of the plurality of security devices.

In accordance with these and other embodiments of the present disclosure, a non-transitory, computer-readable storage medium may embody computer program code, the computer program code comprising computer executable instructions configured for performing packet processing of network traffic on a master security device of a plurality of security devices, such packet processing including connection tracking for the network traffic, and offloading packet inspection of the network traffic to one or more slave security devices of the plurality of security devices.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
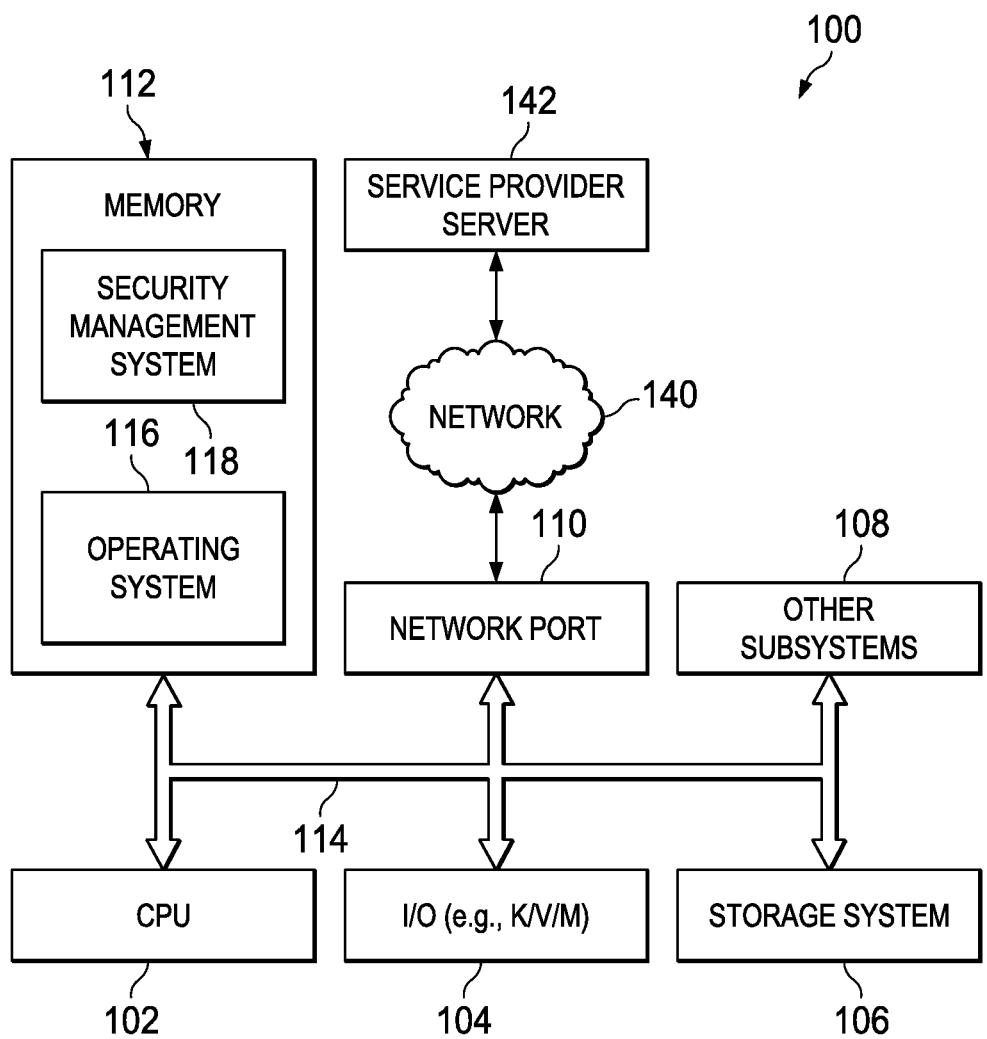
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enforce a network security policy related to network communications between an external network (e.g., external network 202 in FIG. 2) and endpoint device (e.g., endpoint device 244 or 246 in FIG. 2), as described in greater detail elsewhere in this disclosure. In particular, security management system 118 may be configured to perform one or more network management and/or security operations including, but not limited to, connection tracking, dispatching of network traffic, and inspection of network traffic. As described in greater detail below, security management system 118 may have different functionality based on whether the security device (e.g., security device 220 of FIG. 2) in which it resides is a master security device or a slave security device. Security management system 118 of a master security device may perform packet handling functions (e.g., connection management and dispatching) and offload functionality of inspection to security management systems 118 of one or more slave security devices, thus separating packet handling and inspection between security devices and allowing clustering of inspection functionality when multiple slave devices exist.

In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device.

Figure 2:
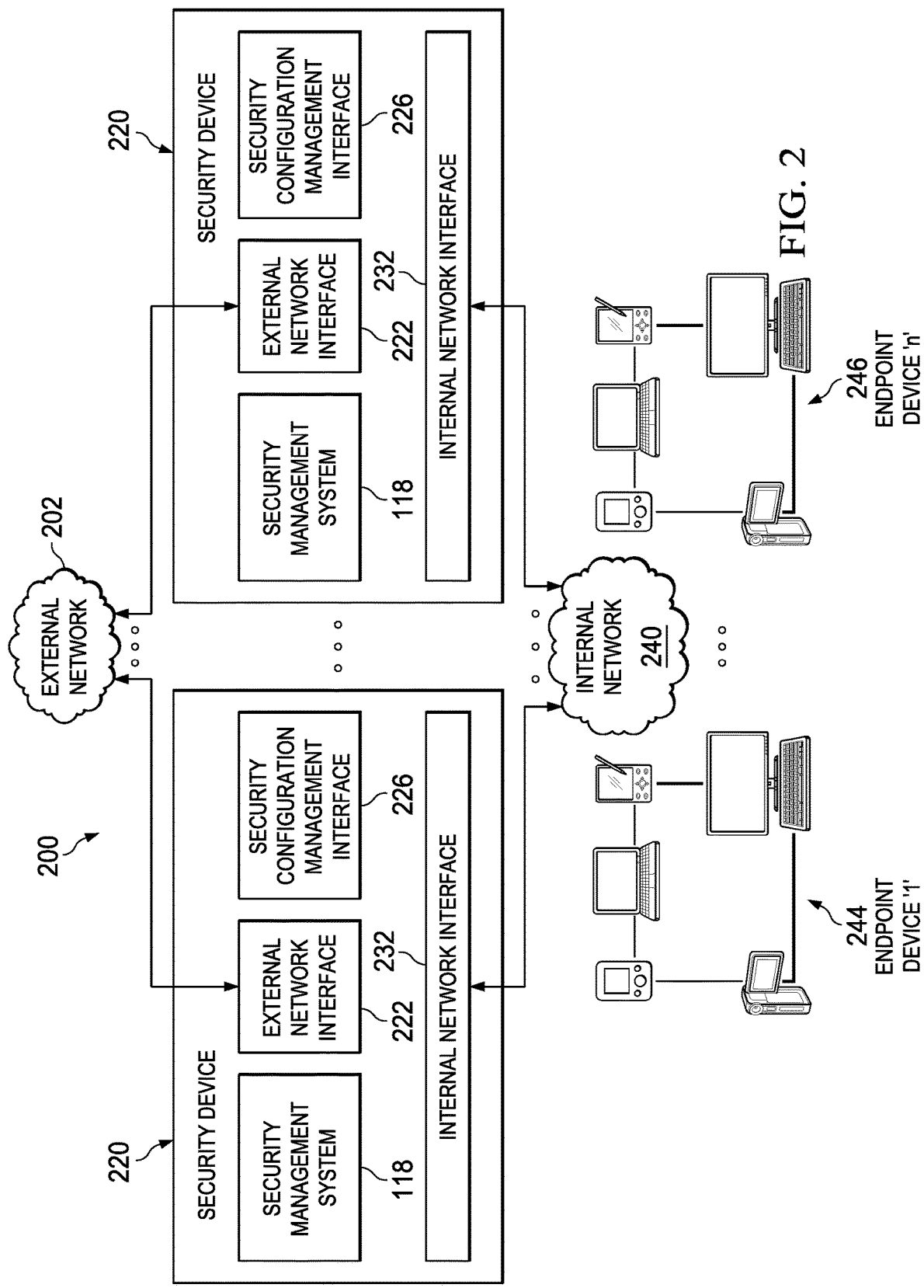
FIG. 2 illustrates a block diagram of a system for performing inspection offload clustering, in accordance with embodiments of the present disclosure.

FIG. 2 illustrates a block diagram of a system 200 for performing inspection offload clustering, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that network communications are often used in an attempt to compromise the security of a network. In particular, payload data of packets in a data stream may include malicious content in an attempt to perform many different types of malicious attacks. Known approaches to intercept malicious content include anti-spoofing, ingress filtering, whitelisting, packet inspection, and other approaches. Those of skill in the art may appreciate that traditional approaches to packet inspection may provide a high level of security in a network, but often require compute-intensive resources.

In operation, a security device 220 may be designated as a master security device or a slave security device. Such designation may be made in any suitable manner, including a rules-based arbitration among security devices 220, designation by a user or administrator, or other suitable manner. In some embodiments, such designation may be inherent based on the actual functional capabilities of a security device 220 or security management system 118 executed thereon. Thus, in a system 200, one or more security devices 220 may be designated as master security devices and one or more security devices 220 may be designated as slave security devices.

Although FIG. 2 depicts security devices 220 as being interfaced between external network 202 and internal network 240, in some embodiments, one or more security devices 220 (particularly slave security devices) may be within external network 202.

Figure 3:
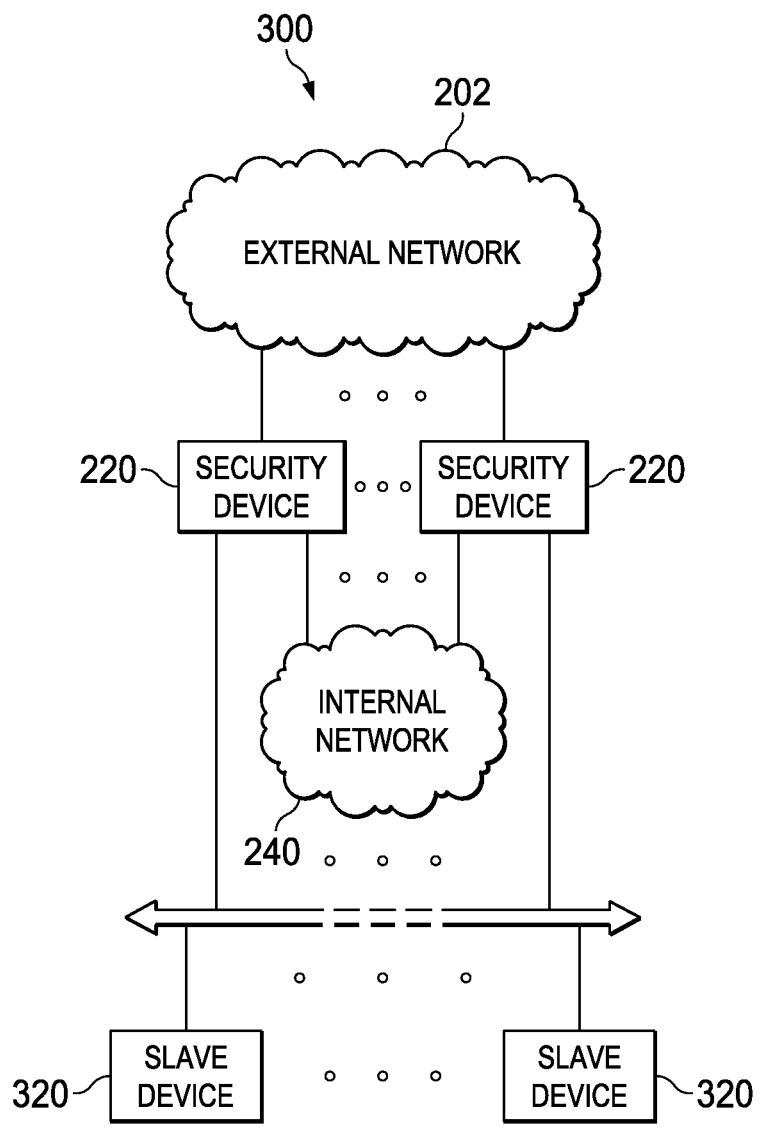
FIG. 3 illustrates a block diagram of another system for performing inspection offload clustering, in accordance with embodiments of the present disclosure.

FIG. 3 illustrates a block diagram of another system 300 for performing inspection offload clustering, in accordance with embodiments of the present disclosure. Although FIG. 2 and the discussion thereof contemplates offloading of inspection to slave devices within external network 202, in some embodiments, such as shown in FIG. 3, slave devices 320 may not be coupled to "master" security devices 220 via external network 202 or internal network 240, but may be more directly coupled to security devices 220.

In operation, a master security device may perform packet processing functions including connection management for network traffic, determining which slave security device of a plurality of slave security devices shall perform inspection for a particular connection or stream of traffic, and dispatching of packets of traffic to slave security devices for inspection, thus offloading inspection of traffic to one or more slave devices. In some embodiments, a master security device may also determine in any suitable manner (e.g., randomly, based on a set of rules, etc.) a slave security device from a plurality of slave security devices to dispatch an inspection. On the other hand, slave devices may receive packets of traffic dispatched from one or more master security devices, perform inspection in accordance with a security policy, and communicate a security decision (e.g., allow or deny) to a master security device so that the master security device can manage connections in accordance with the security decision.

Because connection tracking and other packet processing is performed centrally by one or more master security devices, the synchronization among security devices in traditional clustering architectures in which all nodes of the cluster participate in packet processing and inspection, is not required, thus enabling a linear gain of improvement when scaling to increased numbers of slave security devices.

As example of a particular use case, in some embodiments, a slave device may implement an intrusion detection system in which devices are only listening to traffic For example, slave devices may only be listening to traffic and detecting instruction but no traffic would be passed through a master security device interfaced between external network 202 and internal network 240.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing network communication, comprising:
    performing packet processing of network traffic on a master security device of a plurality of security devices, such packet processing including connection tracking for the network traffic; and
    offloading packet inspection of the network traffic to one or more slave security devices of the plurality of security devices, wherein the connection tracking is performed only by the master security device, without synchronization of connection data to the one or more slave security devices;
    wherein the master security device and the one or more slave security devices are so designated from the plurality of security devices based on a rules-based determination.

2. The method of claim 1, wherein offloading packet inspection comprises:
    dispatching packets of network traffic to the one or more slave security devices for inspection; and
    receiving, responsive to the dispatching, one or more security decisions rendered by the one or more slave security devices responsive to the inspection.

3. The method of claim 2, wherein offloading packet inspection further comprises determining a slave security device from a plurality of slave security devices to dispatch an inspection.

4. The method of claim 2, further comprising managing communication of network traffic based on the security decision.

5. The method of claim 1, wherein the master security device and the one or more slave security devices are so designated from the plurality of security devices by an administrator of the plurality of security devices.

6. The method of claim 1, wherein the master security device is one master security device among a plurality of master security devices within the plurality of security devices.

7. A system comprising:
    a processor; and
    a non-transitory, computer-readable storage medium embodying instructions executable by the processor for:
        performing packet processing of network traffic on a master security device of a plurality of security devices, such packet processing including connection tracking for the network traffic; and
        offloading packet inspection of the network traffic to one or more slave security devices of the plurality of security devices, wherein the connection tracking is performed only by the master security device, without synchronization of connection data to the one or more slave security devices;
    wherein the master security device and the one or more slave security devices are so designated from the plurality of security devices based on a rules-based determination.

8. The system of claim 7, wherein offloading packet inspection comprises:
    dispatching packets of network traffic to the one or more slave security devices for inspection; and receiving, responsive to the dispatching, one or more security decisions rendered by the one or more slave security devices responsive to the inspection.

9. The system of claim 8, wherein offloading packet inspection further comprises determining a slave security device from a plurality of slave security devices to dispatch an inspection.

10. The system of claim 8, the instructions for further managing communication of network traffic based on the security decision.

11. The system of claim 7, wherein the master security device and the one or more slave security devices are so designated from the plurality of security devices by an administrator of the plurality of security devices.

12. The system of claim 7, wherein the master security device is one master security device among a plurality of master security devices within the plurality of security devices.

13. A non-transitory, computer-readable storage medium embodying computer executable instructions configured for:

performing packet processing of network traffic on a master security device of a plurality of security devices, such packet processing including connection tracking for the network traffic; and offloading packet inspection of the network traffic to one or more slave security devices of the plurality of security devices, wherein the connection tracking is performed only by the master security device, without synchronization of connection data to the one or more slave security devices;

wherein the master security device and the one or more slave security devices are so designated from the plurality of security devices based on a rules-based determination.

14. The storage medium of claim 13, wherein offloading packet inspection comprises:

dispatching packets of network traffic to the one or more slave security devices for inspection; and receiving, responsive to the dispatching, one or more security decisions rendered by the one or more slave security devices responsive to the inspection.

15. The storage medium of claim 14, wherein offloading packet inspection further comprises determining a slave security device from a plurality of slave security devices to dispatch an inspection.

16. The storage medium of claim 14, the instructions for further managing communication of network traffic based on the security decision.

17. The storage medium of claim 13, wherein the master security device and the one or more slave security devices are so designated from the plurality of security devices by an administrator of the plurality of security devices.

18. The storage medium of claim 13, wherein the master security device is one master security device among a plurality of master security devices within the plurality of security devices.

* * * * *